(12) United States Patent
Saitsu

(10) Patent No.: US 9,229,413 B2
(45) Date of Patent: Jan. 5, 2016

(54) IMAGE FORMING APPARATUS, SYSTEM AND METHOD FOR CONTROLLING OUTPUT OF A SHEET AFTER OCCURRENCE OF A JAM

(71) Applicant: KONICA MINOLTA, INC., Chiyoda-ku, Tokyo (JP)

(72) Inventor: Yasushi Saitsu, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/445,936

(22) Filed: Jul. 29, 2014

(65) Prior Publication Data
US 2015/0049356 A1    Feb. 19, 2015

(30) Foreign Application Priority Data
Aug. 13, 2013  (JP) .................................. 2013-168052

(51) Int. Cl.
| | |
|---|---|
| G06K 15/00 | (2006.01) |
| G03G 15/00 | (2006.01) |
| B65H 5/26 | (2006.01) |
| H04N 1/387 | (2006.01) |
| B65H 7/06 | (2006.01) |

(52) U.S. Cl.
CPC .................. *G03G 15/70* (2013.01); *B65H 5/26* (2013.01); *B65H 7/06* (2013.01); *G06K 15/4085* (2013.01); *H04N 1/3877* (2013.01); *B65H 2511/528* (2013.01); *B65H 2513/42* (2013.01)

(58) Field of Classification Search
CPC ......... G03G 15/70; B65H 7/06; H04N 1/3877
USPC .................. 358/498, 1.1–3.29, 1.11–1.18
See application file for complete search history.

(56) References Cited

U.S. PATENT DOCUMENTS

| | | | |
|---|---|---|---|
| 2005/0087706 A1* | 4/2005 | Lay .................... | G03G 15/5029 250/559.4 |
| 2009/0041485 A1* | 2/2009 | Shoji ...................... | G03G 15/70 399/43 |
| 2010/0214575 A1* | 8/2010 | Murayama ..................... | 358/1.4 |

FOREIGN PATENT DOCUMENTS

| | | |
|---|---|---|
| JP | 2001158566 A | 6/2001 |
| JP | 2006343727 A | 12/2006 |
| JP | 2008052125 A | 3/2008 |

\* cited by examiner

*Primary Examiner* — Marcellus Augustin
(74) *Attorney, Agent, or Firm* — Holtz, Holtz, Goodman & Chick PC

(57) ABSTRACT

An image forming apparatus includes: an image forming unit configured to form an image on a sheet based on a job; a sheet conveyance unit configured to convey a sheet through a conveyance path; and a control unit configured to control conveyance of a sheet, in which, when a jam has occurred in a sheet of during conveyance, the control unit sets order information of dischargeable sheets among unusable sheets remaining inside the apparatus after occurrence of the jam based on whether there is an unusable sheet on which image formation has been completed in the image forming unit, and discharges the unusable sheet to an outside of the apparatus through the conveyance path based on the set order information.

27 Claims, 10 Drawing Sheets

IMAGE FORMING APPARATUS, SYSTEM AND METHOD FOR CONTROLLING OUTPUT OF A SHEET AFTER OCCURRENCE OF A JAM

The entire disclosure of Japanese Patent Application No. 2013-168052 filed on Aug. 13, 2013 including description, claims, drawings, and abstract are incorporated herein by reference in its entirety.

BACKGROUND OF THE INVENTION

1. Field of the Invention

The present invention relates to an image forming apparatus, a method of forming an image, and an image forming system, which form an image on a sheet based on a job.

2. Description of the Related Art

A copying machine, a facsimile, a printer, or a multifunction machine provided with multi-functions thereof sequentially conveys sheets inside the machine, forms an image on a sheet, and discharges the sheet, and is based on the premise that the sheets are smoothly conveyed through a sheet feeding tray, or the like. A conveyance state of the sheets is grasped with various sensors. When a jam of a sheet is detected by the sensors, conveyance of the sheet is stopped, and sheets remaining inside the machine are discharged.

For example, JP 2008-52125 A discloses that, when a jam of a sheet occurs, sheets physically conveyable to a discharge destination are continuously conveyed and purged, and non-conveyable sheets are automatically purged after removal of the jammed sheet.

Further, JP 2006-343727 A discloses that, when a jam occurs in a single-sided/double-sided common path, purge through a double-sided dedicated path is performed after the jam is handled, and when a jam occurs in the double-sided dedicated path, purge through the double-sided dedicated path is performed after the jam is handled.

By the way, there are problems that, in an image forming apparatus, the number of sheets conveyed inside the machine is increased in accordance with improvement of performance and an increase in size, and once a jam of a sheet occurs, it takes much time to handle the jam, and it becomes difficult to discharge a large number of sheets depending on a portion where the jam has occurred and more time is required for recovery.

For example, conventional sheet conveyance control has a structure in which, when sheets subjected to image formation are sent out to a post-processing unit or to a sheet discharge unit, normal conveyance cannot be performed if the sheets are not sent out in an original discharge order. Meanwhile, when an unusable sheet purge function is implemented, the function being to discharge unusable sheets remaining inside the machine to an outside of the machine using a conveyance path at the time of occurrence of a jam, discharge may not be performed in the original order in which the sheets are supposed to be discharged, depending on a print mode or a position where the jam has occurred.

Example A) A missing page due to a jam in a conveyance unit with branching/merging of post-processing, a paper inserter, and the like.

Example B) Single-sided printed/double-sided printed sheets mixed in a circulation path at the time of double-sided printing.

Therefore, there is a problem that, under control of conventional sheet conveyance, a physically conveyable unusable sheet needs to be manually removed in a state where the device is stopped. Further, there is a problem that sheet conveyance control specific to unusable sheet purge needs to be implemented separately from the conveyance of usable sheets.

SUMMARY OF THE INVENTION

An object of the present invention is to provide an image forming apparatus, a method of forming an image, and an image forming system which are capable of discharging unusable sheets based on set order information of the unusable sheets, when a jam has occurred in a sheet.

To achieve the abovementioned object, according to an aspect, an image forming apparatus reflecting one aspect of the present invention includes an image forming apparatus including: an image forming unit configured to form an image on a sheet based on a job; a sheet conveyance unit configured to convey a sheet through a conveyance path; and a control unit configured to control conveyance of a sheet, wherein when a jam has occurred in a sheet of during conveyance, the control unit sets order information of dischargeable sheets among unusable sheets remaining inside the apparatus after occurrence of the jam based on whether there is an unusable sheet on which image formation has been completed in the image forming unit, and discharges the unusable sheet to an outside of the apparatus through the conveyance path based on the set order information.

In the image forming apparatus of Item 1, the control unit preferably determines whether there is an unusable sheet on which image formation has been completed in the image forming unit based on whether there is an unusable sheet that has arrived at an exit of the image forming unit.

In the image forming apparatus of Item 1, the conveyance path preferably includes branching and merging.

In the image forming apparatus of Item 1, when a jam of a sheet has occurred in one conveyance path that has branched, the control unit preferably performs the discharge of the unusable sheet existing on the conveyance path before branching through a conveyance path branching into another.

In the image forming apparatus of Item 1, the order information is preferably included in data of the job as one piece of attribute information of each sheet.

In the image forming apparatus of Item 1, the control unit preferably adds information indicating that a sheet is unusable to attribute information corresponding to the unusable sheet.

In the image forming apparatus of Item 1, the control unit preferably discharges the unusable sheet to a sheet discharge destination different from a sheet discharge destination of a normal sheet.

In the image forming apparatus of Item 1, when the jam has occurred, the control unit preferably performs the discharge of sheets giving priority to an order of a conveyance path to be used by a normal sheet among sheet-conveyable conveyance paths.

In the image forming apparatus of Item 1, the control unit preferably sets the order information according to an arrangement order of sheets arranged along an order of sheet-conveyable conveyance paths.

In the image forming apparatus of Item 1, the control unit preferably performs the discharge of sheets without changing an order as a result of order information determination in the setting of the order information.

In the image forming apparatus of Item 1, the control unit preferably changes an order and performs the discharge of sheets as a result of order information determination in the setting of the order information.

In the image forming apparatus of Item 1, when discharging an unusable sheet, the control unit preferably sets the sheet not to be subjected to post-processing.

In the image forming apparatus of Item 1, when discharging an unusable sheet, the control unit preferably sets size information in attribute information of the sheet to a maximum size with which conveyance setting is possible.

In the image forming apparatus of Item 1, when discharging an unusable sheet, the control unit preferably sets basis weight information in attribute information of the sheet to a maximum basis weight with which conveyance setting is possible.

In the image forming apparatus of Item 1, when the jam has occurred, the control unit preferably stops conveyance of the sheet, and discharges the unusable sheet after removal of the jammed sheet.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, an embodiment of the present invention will be described with reference to the drawings. However, the scope of the invention is not limited to the illustrated examples.

Figure 1:
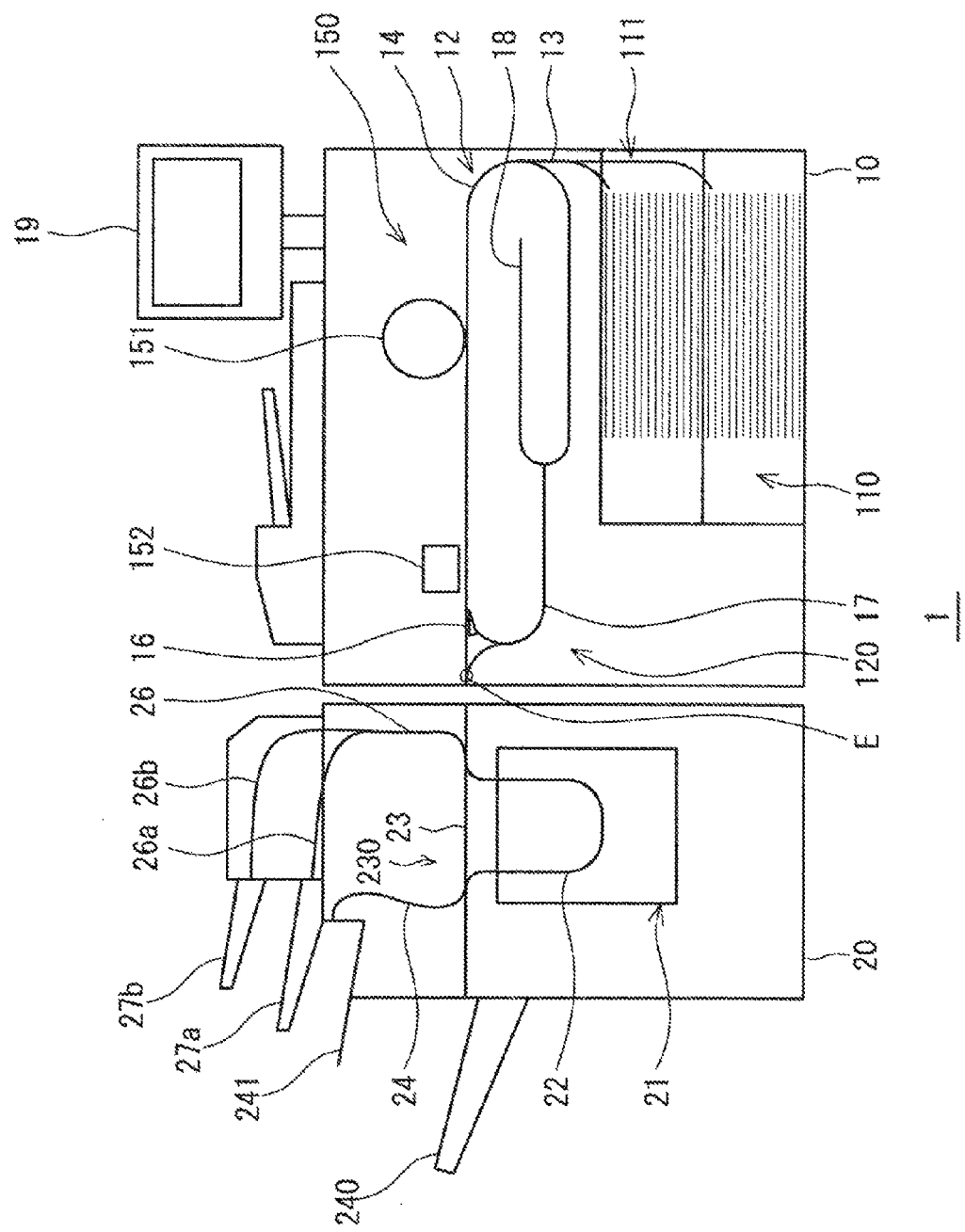
FIG. 1 is a diagram illustrating an image forming apparatus and an image forming system according to an embodiment of the present invention.
Figure 2:
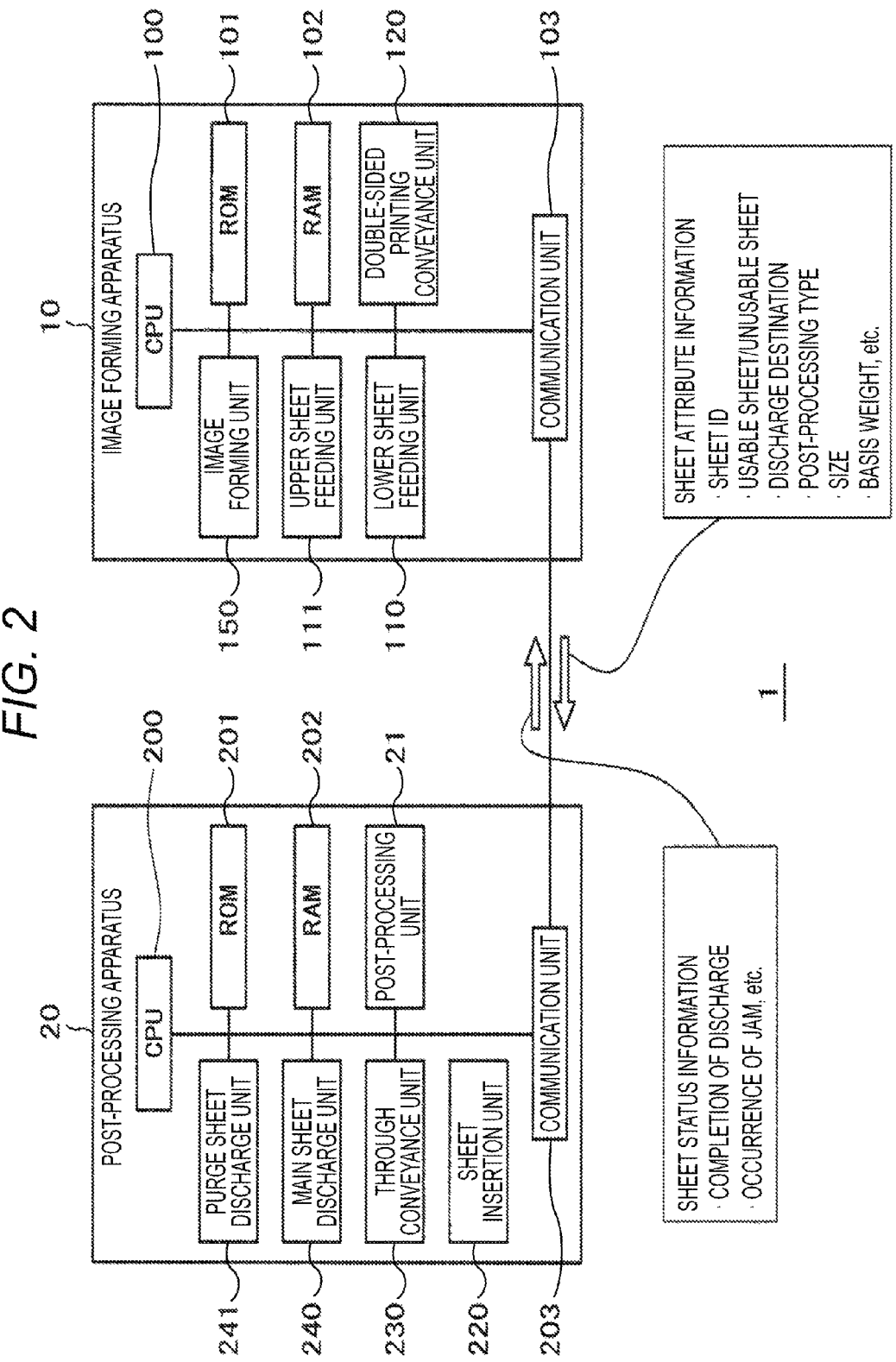
FIG. 2 is a diagram describing a block configuration of the image forming apparatus and the image forming system.

Hereinafter, an image forming apparatus and an image forming system according to an embodiment of the present invention will be described with reference to FIGS. 1 and 2.

An image forming system 1 includes an image forming apparatus 10 and a post-processing apparatus 20. The post-processing apparatus 20 is one of external apparatuses of the present invention, and the number of the post-processing apparatuses 20 is not especially limited. Further, the present invention may be configured from only the image forming apparatus.

The image forming apparatus 10 includes a lower sheet feeding unit 110 and an upper sheet feeding unit 111 at a lower stage, and a sheet feeding path 13 is connected from the upper sheet feeding unit 111 to the lower sheet feeding unit 110. These units and the path as a whole are referred to as sheet feeding unit. The upper sheet feeding unit 111 can be configured from a sheet feeding unit such as manual feeding, a large-capacity sheet feeding tray, and the like, which are provided in the image forming apparatus 10.

The sheet feeding path 13 is connected to a main conveyance path 14 that passes through an image forming unit 150, and the main conveyance path 14 extends to an exit of the image forming apparatus 10 and is connected to a conveyance path in the post-processing apparatus 20.

A switching unit 16 is provided to the main conveyance path 14 at a downstream side of a photoreceptor 151 and a fixing device 152 in the image forming unit 150, and a double-sided conveyance path 17 branches from the main conveyance path 14. The double-sided conveyance path 17 configures a part of a double-sided printing conveyance unit 120. In the double-sided printing conveyance unit 120, an inverting path 18 branches from/is merged with the double-sided conveyance path 17. A sheet sent to the inverting path 18 is inverted after stopped, conveyed to a downstream side of the double-sided conveyance path 17, and merged with the main conveyance path 14, so that inversion of the sheet is performed.

A conveyance path 12 inside the image forming apparatus 10 is configured from the sheet feeding path 13, the main conveyance path 14, the double-sided conveyance path 17, and the inverting path 18. Further, a sheet conveyance unit of the image forming apparatus 10 is configured from the conveyance path 12, a conveyance roller (not illustrated), a driving motor (not illustrated), and the like.

Note that an operation display unit 19 is provided above a main body of the image forming apparatus, and can display various types of information and input operations. Note that the operation display unit may be configured from an operation unit and a display unit as separate units, or may be used as both of the operation unit and the display unit like a touch panel.

The post-processing apparatus 20 includes a main conveyance path 22 connected to the main conveyance path 14 of the image forming apparatus 10, and the main conveyance path 22 is connected to a main sheet discharge unit 240 through a post-processing unit 21.

Further, a bypass conveyance path 23 that bypasses the post-processing unit 21 branches from the main conveyance path 22, and is merged with the main conveyance path 22 again at a downstream side of the post-processing unit 21, so that a through conveyance unit 230 is configured from the bypass conveyance path 23, a switch configuration, and the like.

Further, a purge conveyance path 24 branches from a point where the main conveyance path 22 and the bypass conveyance path 23 are merged, or from a position at a downstream side of the point. The purge conveyance path 24 is connected to a purge sheet discharge unit 241.

Further, an insertion conveyance downstream path 26 is merged with a point where the main conveyance path 22 and the bypass conveyance path 23 branch, or with a point at an upstream side of the point, and an insertion conveyance upstream path 26a and an insertion conveyance upstream path 26b are merged at an upstream end side of the insertion conveyance downstream path 26. Insertion trays 27a and 27b are provided at upstream end sides of the insertion conveyance upstream paths 26a and 26b.

The main conveyance path 22, the bypass conveyance path 23, the insertion conveyance upstream paths 26a and 26b, and the insertion conveyance downstream path 26 configure the conveyance path 12 inside the post-processing apparatus 20. Further, a sheet conveyance unit of the post-processing apparatus 20 is configured from the conveyance path 12, a conveyance roller (not illustrated), a driving motor (not illustrated), and the like.

Next, a control block of the image forming system 1 will be described with reference to FIG. 2.

The image forming system 1 includes a control block that controls the image forming apparatus 10, and a control block that controls the post-processing apparatus, and the image forming apparatus 10 includes a CPU 100 that controls the image forming apparatus 10 and the entire image forming system 1. The CPU 100 configures a control unit of the present invention.

A ROM 101 in which programs that control the image forming apparatus and the image forming system, and the like are stored, and a RAM 102 that serves as a work area or a storage location of job data are controllably connected to the CPU 100.

Further, the image forming unit 150 is controllably connected to the CPU 100. The image forming unit 150 performs image forming processing in an electrophotographic method based on input job data (image data). The image forming unit 150 includes the photoreceptor 151 as an image carrier, a charging unit (not illustrated), an exposure unit (a laser light source and a polygon mirror), a developing unit, a transfer unit, a separation/static elimination unit, a cleaner, and the fixing device 152.

In image formation, in the image forming unit 150, a surface of the photoreceptor 151 is exposed by the laser light source and the polygon mirror, the surface being uniformly charged by the charging unit and being rotated, and an electrostatic latent image corresponding to image data is formed on the surface of the photoreceptor 151. Then, in the image forming unit 150, the electrostatic latent image is inverted and developed by the developing unit, and a black toner image is formed on the photoreceptor 151. Then, in the image forming unit 150, the toner image formed on the surface of the photoreceptor 151 is transferred to the sheet charged to an opposite polarity in a transfer region by the transfer unit, corresponding to a timing of the toner image formation. The sheet is conveyed to the transfer unit by the main conveyance path 14 in accordance with the timing. Then, in the image forming unit 150, the sheet on which the toner image is carried is separated from the surface of the photoreceptor 151 by an action of the separation/static elimination unit, the sheet is sent to the fixing device 152, and the toner of the photoreceptor 151 is removed with a cleaner.

Note that, in the present embodiment, the image forming apparatus 10 has been described to have a configuration to form a monochromatic image. However, the image forming apparatus 10 is not limited to the description, and may be an image forming apparatus that forms a color image with four colors of C (cyan), M (magenta), Y (yellow), and K (black).

Further, the lower sheet feeding unit 110 and the upper sheet feeding unit 111 are controllably connected to the CPU 100. In image formation, the CPU 100 causes the lower sheet feeding unit 110 or the upper sheet feeding unit 111 to feed a necessary sheet. The sheet is conveyed by the sheet conveyance unit inside the image forming apparatus 10.

The double-sided printing conveyance unit 120 is controllably connected to the CPU 100.

A single-sided printed sheet printed in the image forming unit 150 is conveyed from the image forming apparatus 10 to the post-processing apparatus 20 by the switching unit 16 controlled by the CPU 100. Meanwhile, when double-sided printing is performed, a sheet conveyed on the main conveyance path 14 by the switching unit 16 controlled by the CPU 100 is sent to the double-sided conveyance path 17 in the double-sided printing conveyance unit 120. In the double-sided printing conveyance unit 120, the sheet having been sent to the double-sided conveyance path 17 is once sent to the inverting path 18, stopped, inverted, and sent to a downstream side of the double-sided conveyance path 17, so that the front and the rear of the sheet is switched and conveyed. The sheet is merged with the main conveyance path 14 and sent to a downstream side of the main conveyance path 14, and image formation on a back surface side is performed by the image forming unit 150. The sheet subjected to double-sided image formation is passed through the main conveyance path 14 as is by the switching unit 16 controlled by the CPU 100 and passed through an image forming unit exit E, and conveyed to the post-processing apparatus 20 side.

Further, a communication unit 103 is controllably connected to the CPU 100. The communication unit 103 performs communication with an external device connected to the image forming apparatus 10, and is capable of serial communication, for example. In this embodiment, the communication unit 103 can perform transfer of data with a communication unit 203 of the post-processing apparatus 20.

The post-processing apparatus 20 includes a CPU 200 that controls the post-processing apparatus 20 by an instruction of the CPU 100.

A ROM 201 in which programs that control the post-processing apparatus, and the like are stored, and a RAM 202 that serves as a work area are controllably connected to the CPU 200.

The post-processing unit 21 is controllably connected to the CPU 200, and predetermined post-processing is executed by the CPU 200 based on a post-processing instruction by the CPU 100. Note that the content of the post-processing is not especially limited in the present invention, and appropriate processing is performed, such as stapling, punching, and holding processing. The post-processing may be formed of a plurality of pieces of processing.

Further, the CPU 200 includes a sheet insertion unit 220 that inserts another sheet into sheets subjected to the image formation, and the sheet insertion unit 220 is configured from the insertion trays 27a and 27b, the insertion conveyance upstream paths 26a and 26b, the insertion conveyance downstream path 26, a conveyance roller (not illustrated), a driving motor (not illustrated), and the like.

An insertion sheet housed in the insertion trays 27a or 27b is inserted into the main conveyance path 22 through the insertion conveyance upstream path 26a or the insertion conveyance upstream path 26b, and through the insertion conveyance downstream path 26, by control of the CPU 200 by an instruction of the CPU 100.

Further, when the post-processing is not performed in the post-processing unit 21, the sheet is conveyed through the through conveyance unit 230 including the bypass conveyance path 23, and is mainly conveyed into the main conveyance path 22.

Further, the main sheet discharge unit 240 provided as a sheet discharge destination of the main conveyance path 22 is controllably connected to the CPU 200, and further, the purge sheet discharge unit 241 provided as a sheet discharge destination of the purge conveyance path 24 is controllably connected to the CPU 200. The main sheet discharge unit 240 is a sheet discharge destination into which a normal sheet is usually discharged, and the purge conveyance path 24 is a sheet discharge destination into which an unusable sheet is usually discharged when the unusable sheet is caused.

Further, the communication unit 203 is controllably connected to the CPU 200, and can perform serial communication with the communication unit 103 of the image forming apparatus 10.

In the image forming apparatus 10, in execution of a job, sheet attribute information of each sheet included in job data is transmitted from the communication unit 103 by an instruction of the CPU 100, and the sheet attribute information is received by the communication unit 203. The data acquired in the communication unit 203 is transmitted to the CPU 200, and a processing procedure in the post-processing apparatus 20 is determined. Note that, as the sheet attribute information, a sheet ID, distinction of usable sheet/unusable sheet, a discharge destination, a post-processing type, a size, a basis weight, and the like are included. The sheet attribute information is stored in the RAM 102 as the job data together with image data. Order information of the present invention is stored in the sheet ID. The order information may indicate a feeding order, or may set a sheet discharging order.

Further, in the communication unit 203, sheet status information acquired in the post-processing apparatus 20 is transmitted, and is received by the communication unit 103. The data received in the communication unit 103 is transmitted to the CPU 100, and is used for control of the image forming apparatus and the image forming system. Note that examples of the sheet status information include discharge completion, jam occurrence, and the like.

Note that, appropriate sensors are arranged on the respective conveyance paths of the image forming apparatus 10 and the post-processing apparatus 20, and can detect a jam of a sheet. In the image forming apparatus 10, a detection result is transmitted to the CPU 100, while in the post-processing apparatus 20, a detection result is transmitted to the CPU 200. Jam occurrence data acquired in the CPU 200 is transmitted to the CPU 100 through the communication units 203 and 103, as described above. Note that a method of detecting a jam is not especially limited in the present invention. A jam can be detected by a method of detecting a jam with a predetermined sensor when a sheet does not arrive by a predetermined arrival time during sheet conveyance. Hereinafter, operations at the time of occurrence of a jam will be described.

(Jam Occurrence State 1)

In this state, discharge of following sheets of when an insertion sheet in the sheet insertion unit 220 is jammed will be described with reference to FIGS. 3 to 5.

Figure 3:
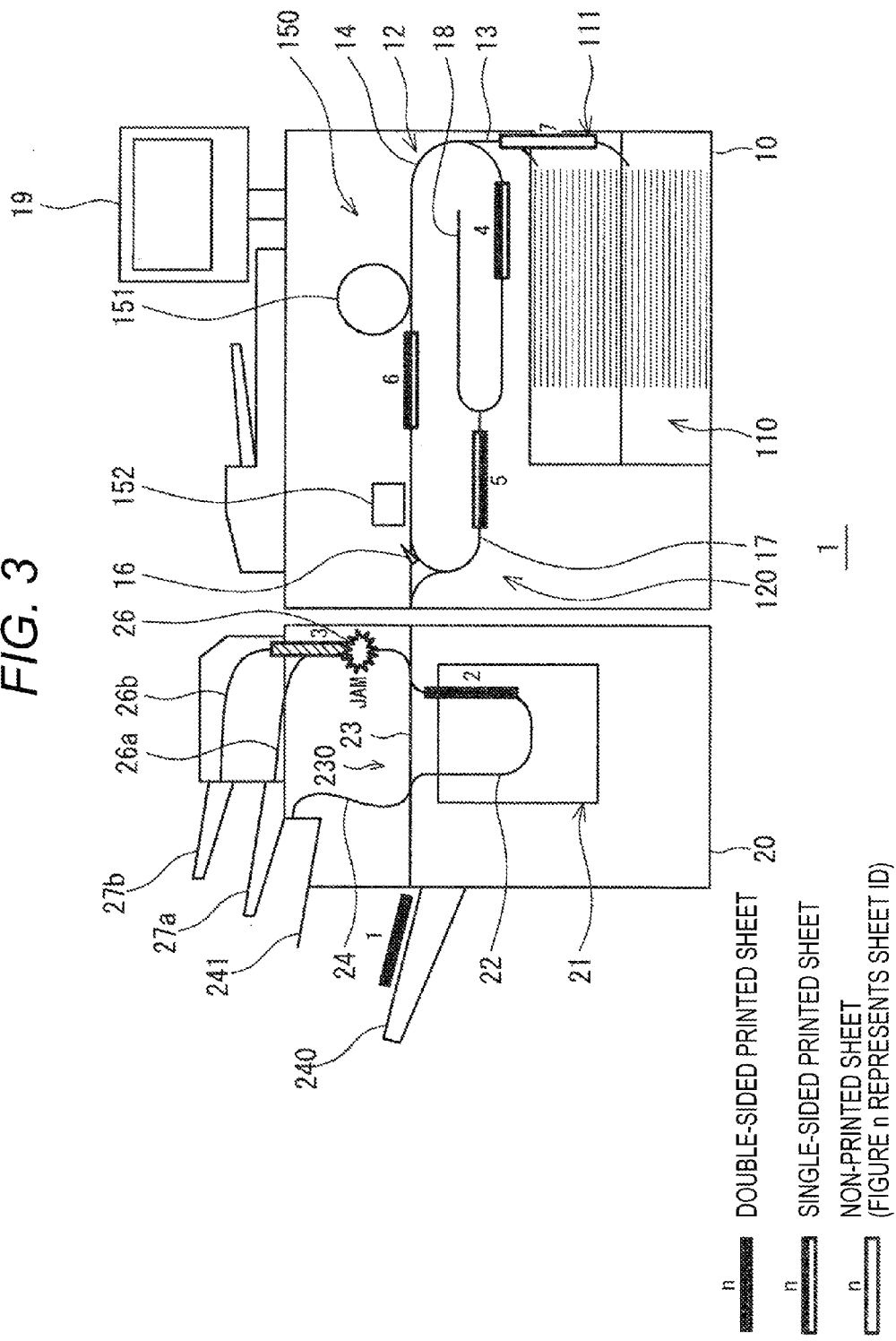
FIG. 3 is a diagram illustrating a sheet conveyance state of the image forming apparatus and the image forming system in an example of jam occurrence.

In FIG. 3, when a jam has occurred in the sheet insertion unit 220, a first sheet (sheet ID: 1) is discharged into the main sheet discharge unit 240, and a second sheet (sheet ID: 2) is positioned at the main conveyance path 22 in the post-processing unit 21. A third sheet (sheet ID: 3) is in a state of occurrence of a jam from the insertion conveyance upstream path 26b to the insertion conveyance downstream path 26. A fourth sheet (sheet ID: 4) is at a downstream side of the double-sided conveyance path 17 after passing through a branching and merging point with the inverting path 18, a fifth sheet (sheet ID: 5) is at an upstream side of the double-sided conveyance path 17 before the branching and merging point with the inverting path 18, a sixth sheet (sheet ID: 6) is positioned on the main conveyance path 14 after image formation has been made to one surface of the sheet, and a seventh sheet (sheet ID: 7) is positioned at the sheet feeding path 13. At the time of occurrence of the jam, the sheets of the sheet IDs 4, 5, 6, and 7 can be conveyed as unusable sheets.

In the CPU 100, when occurrence of a jam is detected in the sheet insertion unit 220, the following is performed.

(A-1) Conveyance of a jammed sheet inside the sheet insertion unit 220 and conveyance in the conveyance paths at the upstream side thereof are stopped by the sheet conveyance unit of the post-processing apparatus 20. Alternatively, conveyance of the sheet insertion unit/the double-sided printing conveyance unit/the image forming unit/the sheet feeding unit is stopped.

(A-2) Unusable sheet information is added to the sheet attribute information of falsely-fed sheets (sheet IDs=4, 5, and 6) of following sheets of the insertion sheet. Note that the falsely-fed sheets indicate unusable sheets remained inside the machine before completion of image formation at the time of occurrence of a jam.

(A-3) Unusable sheet purge processing is started in a state where conveyance is continued. Alternatively, the conveyance is started again after removal of the jammed sheet, and the unusable sheet purge processing is started.

(A-4) The following processing is performed with respect to the sheet attribute information of the unusable sheets when the unusable sheets are passed through the image forming unit exit E of the image forming apparatus 10.

Figure 4:
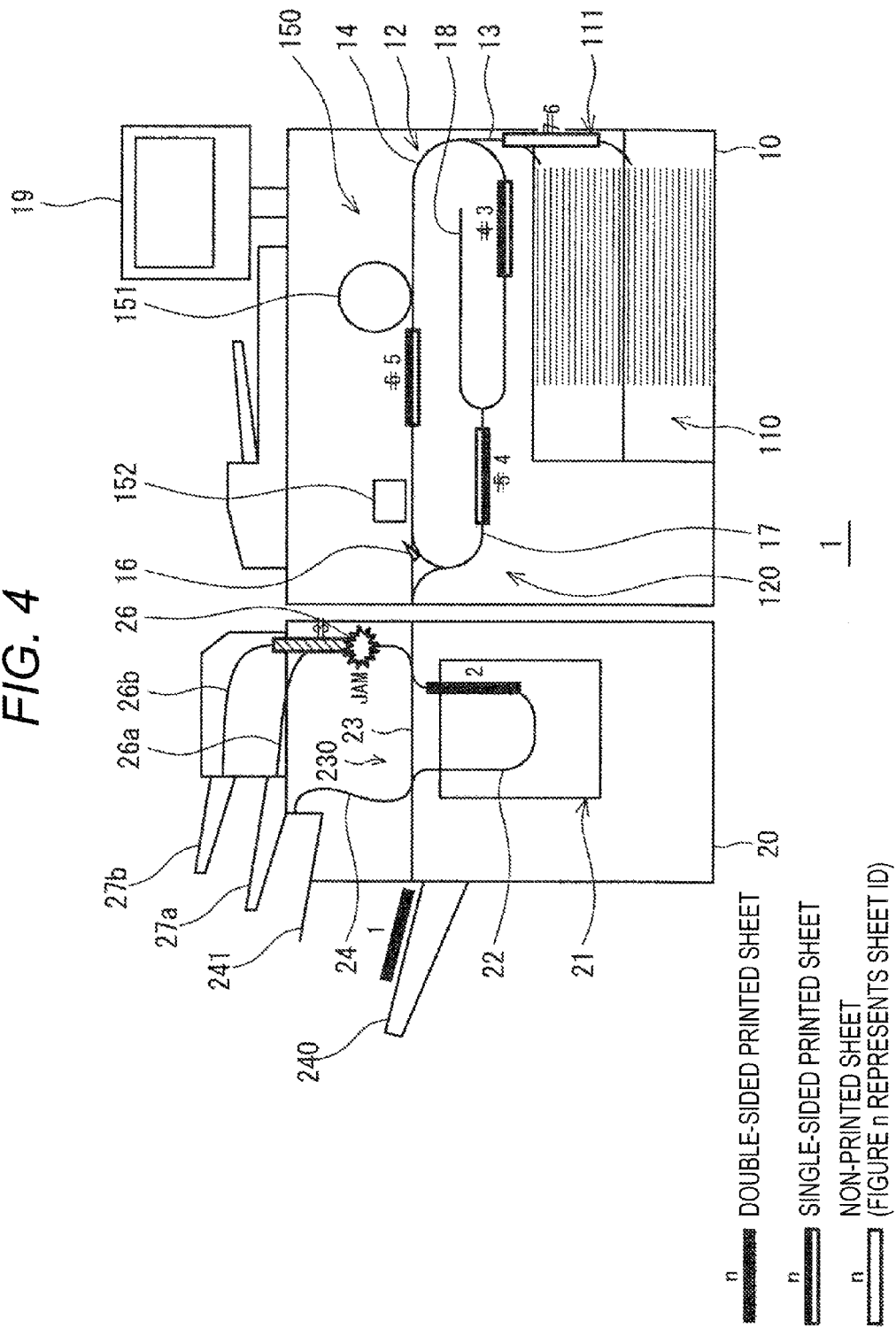
FIG. 4 is a diagram describing setting of order information of sheets in the example of jam occurrence.

(A-4-1) The sheet ID information of the unusable sheets are rewritten to an order in which the jammed sheet is skilled, as illustrated in Table 1 and FIG. 4. (the sheet ID 4→3, the sheet ID 5→4, the sheet ID 6→5, and the sheet ID 7→6) The conveyance path at that time is configured from the same order as the conveyance path through which the normal sheet is discharged.

At this time, after the sheet of the rewritten sheet ID 5 is conveyed to the double-sided printing conveyance unit 120, the switching unit 16 is switched before the sheets of the rewritten sheet IDs 3 and 4 are conveyed, so that the following sheets after the switching are passed through the main conveyance path 14 and discharged without being sent to the double-sided printing conveyance unit 120.

TABLE 1

| | First sheet | Second sheet | Third sheet | Fourth sheet | Fifth sheet | Sixth sheet |
|---|---|---|---|---|---|---|
| Before rewriting | ID = 1 | ID = 2 | ID = 3 {PI} | ID = 4 | ID = 5 | ID = 6 |
| | Usable sheet | Usable sheet | Jammed sheet | Unusable sheet | Unusable sheet | Unusable sheet |
| | ↓ | ↓ | | ↓ | ↓ | ↓ |
| After rewriting | ID = 1 Usable sheet | ID = 2 Usable sheet | — | ID = 3 Unusable sheet | ID = 4 Unusable sheet | ID = 5 Unusable sheet |

(A-4-2) Discharge destination information of the unusable sheets is rewritten to the purge sheet discharge unit.

(A-4-3) Post-processing type information of the unusable sheets are rewritten to no post-processing.

(A-4-4) Ina case of a print job including sheets having different sizes, the size information of the unusable sheets is rewritten to a maximum size that can be supported by the system. This is because, when the sheet IDs and the size information are managed in association with each other in advance, mixing up of the size information may be caused due to the change of the sheet IDs. Here, the size information is changed into the maximum size (330 mm×437 mm).

(A-4-5) Ina case of a print job including sheets having different basis weights, the basis weight information of the unusable sheets is rewritten to a maximum basis weight that can be supported by the system. This is because, when the sheet IDs and the basis weight information are managed in association with each other in advance, mixing up of the basis weight information may be caused due to the change of the sheet IDs. Here, the basis weight information is changed into the maximum basis weight (350 g/m2).

Figure 5:
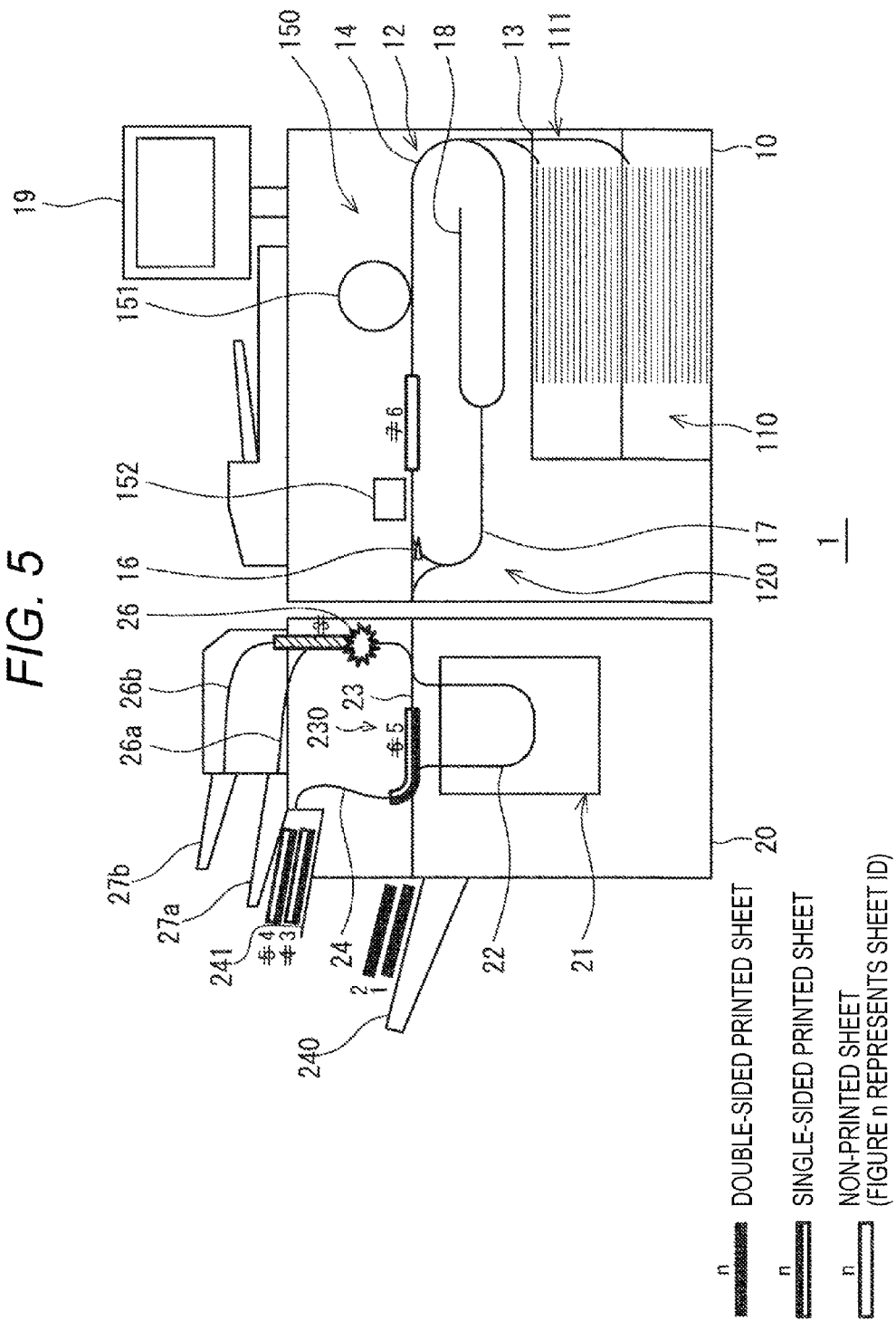
FIG. 5 is a diagram describing a discharge state of sheets to which the order information has been set in the example of jam occurrence.

(A-5) With the above operations, by control of the conveyance of the unusable sheets according to the sheet IDs, similarly to usable sheets, the unusable sheets can be efficiently discharged to the purge sheet discharge unit as illustrated in FIG. 5. FIG. 5 illustrates a state in which the sheets of the rewritten sheet IDs 3 and 4 have been discharged to the purge sheet discharge unit 241, the sheet of the rewritten sheet ID 5 is being discharged while being passed through the bypass conveyance path 23, and the sheet of rewritten sheet ID 6 is being discharged while being passed through the main conveyance path 14.

Note that the embodiment has been described such that the purge processing of the unusable sheets is started before the jammed sheet is manually removed. However, the purge processing may be started after the jammed sheet is removed. The start timing of the purge processing may be set by mechanical setting, in advance, and the setting may be able to be changed irrespective of the time of occurrence of a jam occurrence. Alternatively, the start of the purge processing may be able to be operated by an operator.

(Jam Occurrence State 2)

Figure 6:
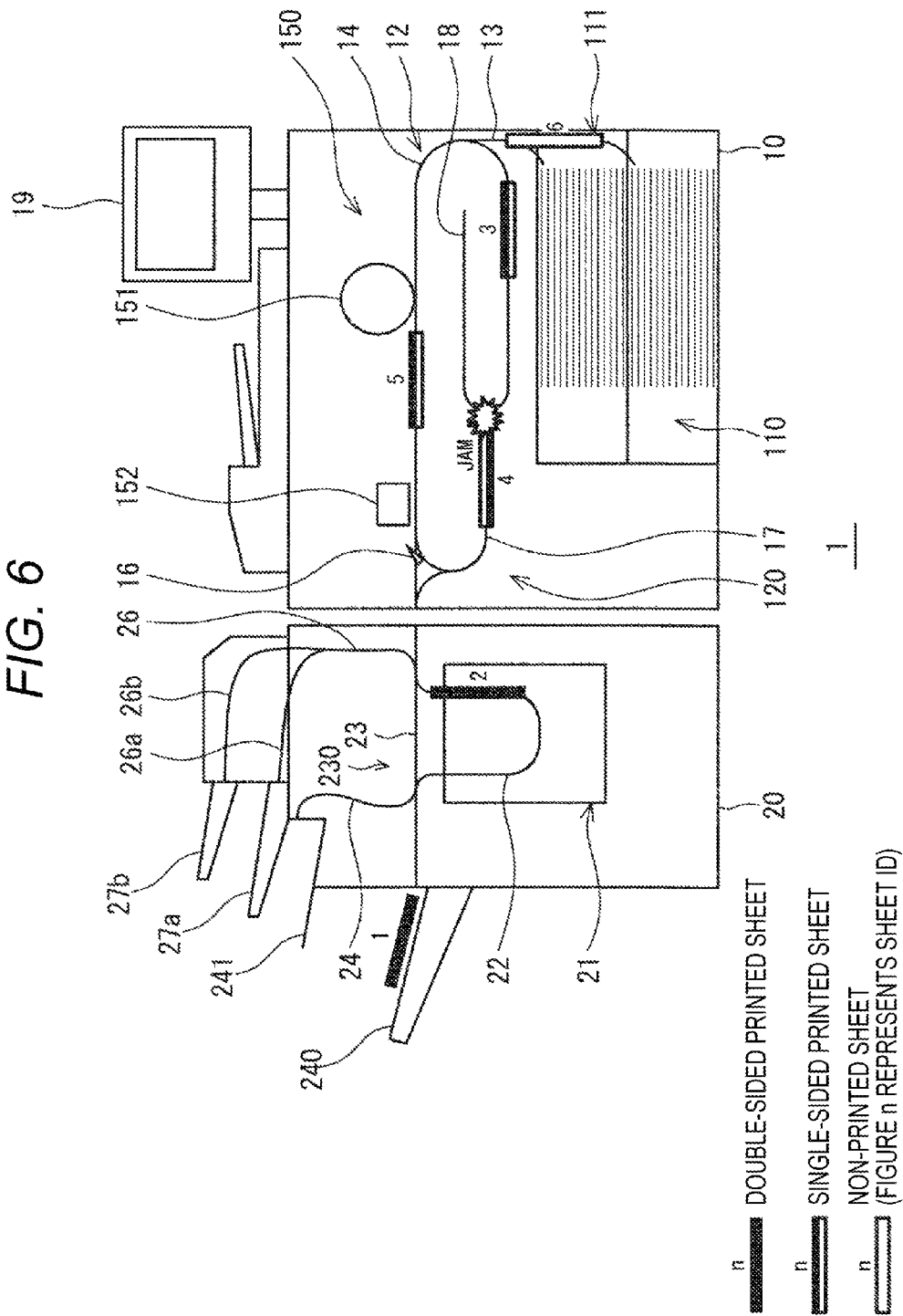
FIG. 6 is a diagram illustrating a sheet conveyance state of the image forming apparatus and the image forming system in another example of jam occurrence.

Next, another jam occurrence form will be described with reference to FIGS. 6 to 8.

In this form, a case in which a single-sided printed sheet is jammed in the double-sided printing conveyance unit 120 will be described. When a jam has occurred, a first sheet (sheet ID: 1) is discharged into the main sheet discharge unit 240, and a second sheet (sheet ID: 2) is positioned at the main conveyance path 22 within the post-processing unit 21. A third sheet (sheet ID: 3) is positioned at a downstream side of the double-sided conveyance path 17, and a jam has occurred in a fourth sheet (sheet ID: 4) at the double-sided conveyance path 17 at an upstream side of a point where the inverting path branches and is merged. A fifth sheet (sheet ID: 5) is positioned on the main conveyance path 14 after the image formation has been made to one surface of the sheet, and a sixth sheet (sheet ID: 6) is positioned at the sheet feeding path 13. At the time of occurrence of the jam, the sheets of the sheet IDs 3, 5, and 6 can be conveyed as unusable sheets.

When occurrence of a jam is detected in the double-sided printing conveyance unit 120, the CPU 100 performs the following processing.

(B-1) Conveyance of the jammed sheet in the double-sided printing conveyance unit and conveyance in the upstream side thereof are stopped, or conveyance of the double-sided printing conveyance unit/the image forming unit/the sheet feeding unit is stopped. Further, switching of a switch gate into a horizontal direction suppresses entering of a new sheet into the double-sided printing conveyance unit 120.

(B-2) The unusable sheet information is added to the dischargeable unusable sheet (IDs=3, 5, and 6).

(B-3) The unusable sheet purge processing is started in a state where the conveyance is continued. Alternatively, the conveyance is restarted after removal of the jammed sheet, and the unusable sheet purge processing is started.

(B-4) When the unusable sheets are passed through the image forming unit exit E, the following processing is performed with respect to the sheet attribute information of the unusable sheets.

Figure 7:
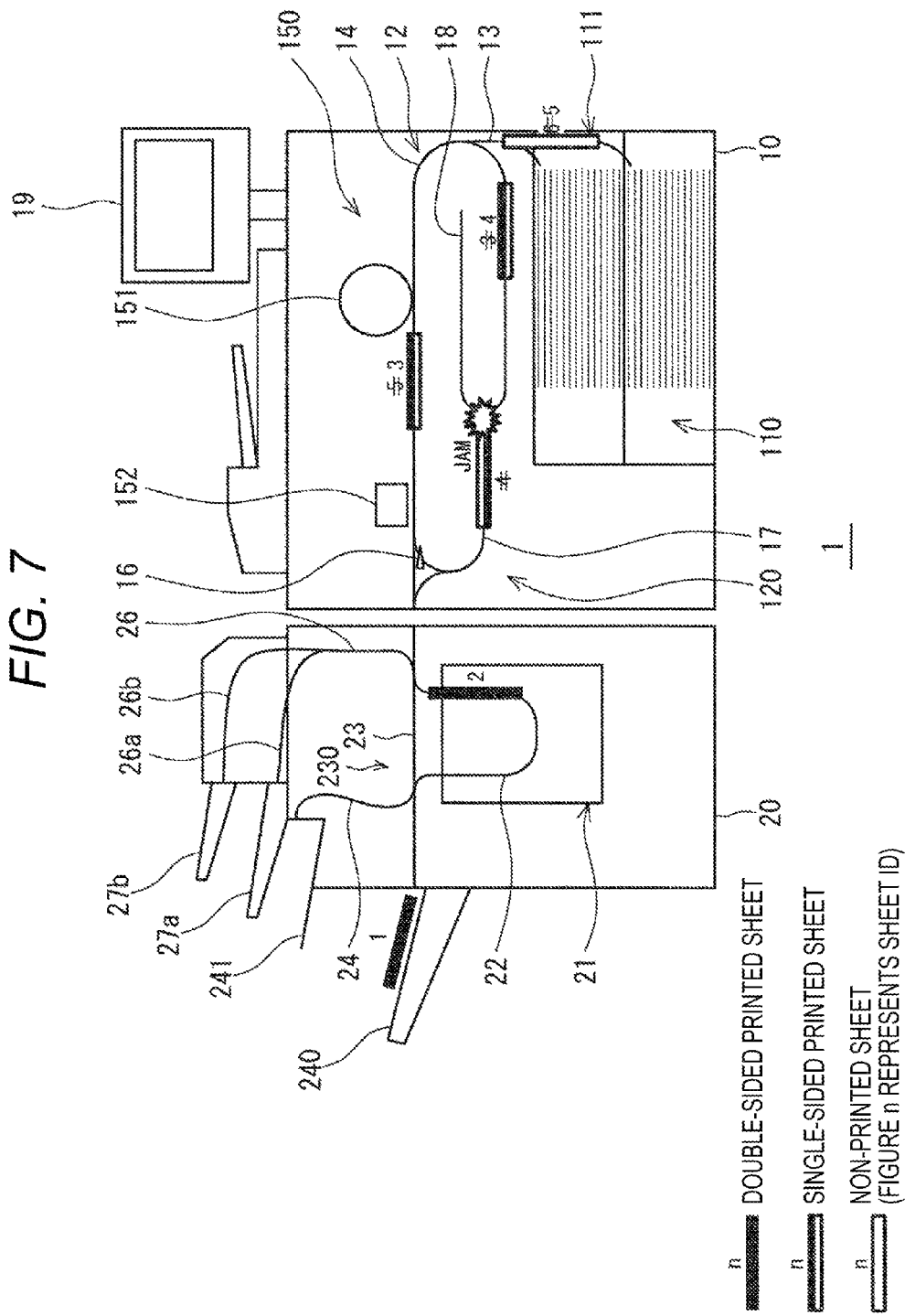
FIG. 7 is a diagram describing setting of the order information of sheets in the another example of jam occurrence.

(B-4-1) The sheet ID information of the unusable sheets is rewritten to an order (ascending order) illustrated in Table 2 and FIG. 7. (the sheet ID 5→3, the sheet ID 3→4, and the sheet ID 6→5). The order at that time is an order of the sheets that can be discharged on a conveyable conveyance path.

TABLE 2

|  | First sheet | Second sheet | Third sheet | Fourth sheet | Fifth sheet | Sixth sheet |
| --- | --- | --- | --- | --- | --- | --- |
| Before rewriting | ID = 1 Usable sheet | ID = 2 Usable sheet | ID = 5 Unusable sheet | ID = 3 Unusable sheet | ID = 6 Unusable sheet | ID = 4 Jammed sheet |
|  | ↓ | ↓ | ↓ | ↓ | ↓ | ↓ |
| After rewriting | ID = 1 Usable sheet | ID = 2 Usable sheet | ID = 3 Unusable sheet | ID = 4 Unusable sheet | ID = 5 Unusable sheet | — |

(B-4-2) The discharge destination information of the unusable sheets is rewritten to the purge sheet discharge unit.

(B-4-3) The post-processing type information of the unusable sheets is rewritten to no post-processing.

(B-4-4) Ina case of a print job including sheets having different sizes, the size information of the unusable sheets is rewritten to a maximum size that can be supported by the system. This is because, when the sheet IDs and the size information are managed in association with each other in advance, mixing up of the size information may occur due to the change of the sheet IDs. Here, the size information is changed into the maximum size (330 mm×437 mm).

(B-4-5) In a case of a print job including sheets having different basis weights, the basis weight information of the unusable sheets is rewritten to a maximum basis weight that can be supported by the system. This is because, when the sheet IDs and the basis weight information are managed in association with each other in advance, mixing up of the basis weight information may occur due to the change of the sheet IDs. Here, the basis weight information is changed into the maximum basis weight (350 g/m2).

Figure 8:
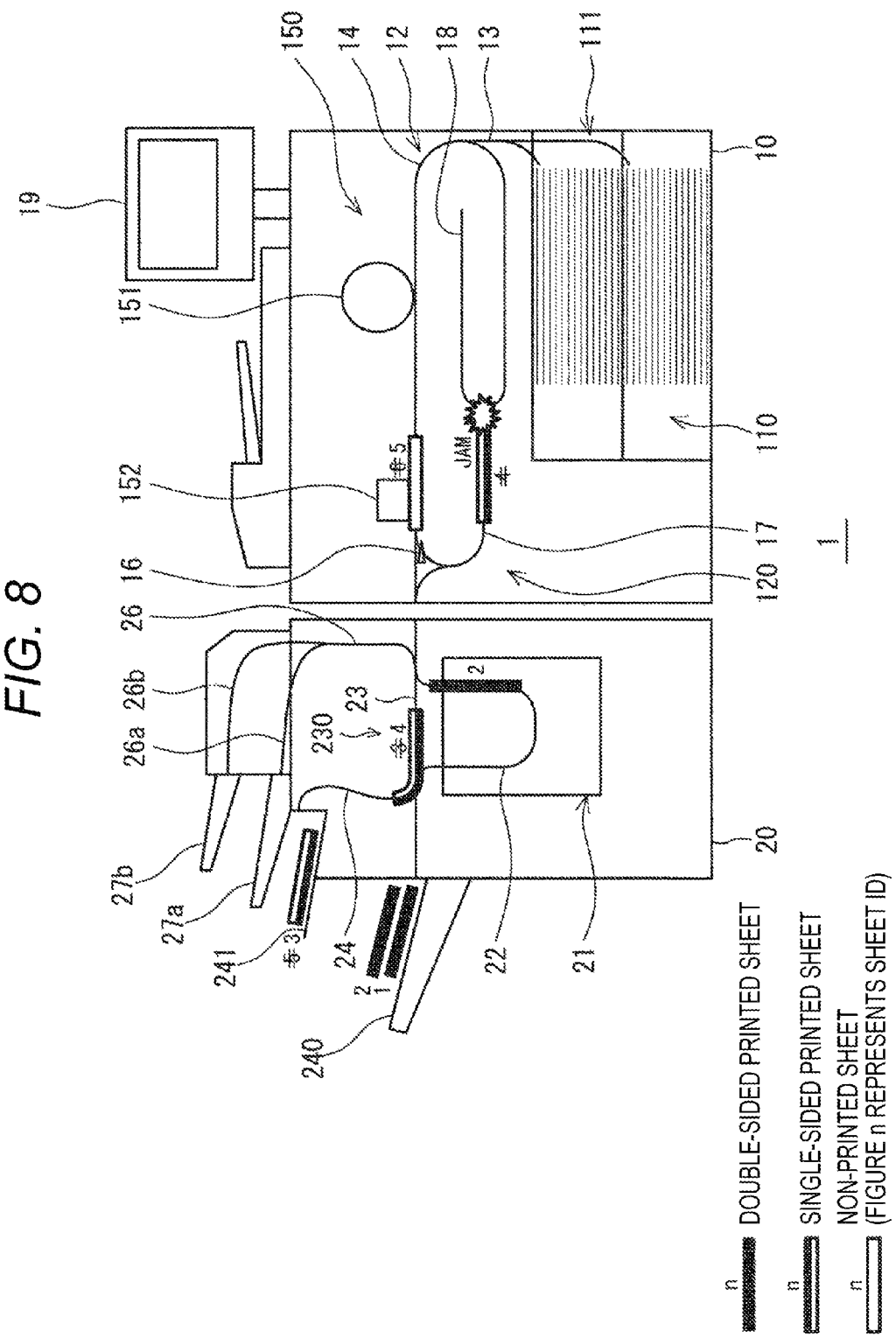
FIG. 8 is a diagram describing a discharge state of sheets to which the order information has been set in the another example of jam occurrence.

(B-5) With the above operations, by control of conveyance of the unusable sheets according to the sheet IDs, similarly to usable sheets, the unusable sheets can be discharged into the purge sheet discharge unit as illustrated in FIG. 8.

FIG. 8 illustrates a state in which the sheet of the rewritten sheet ID 3 has been discharged to the purge sheet discharge unit 241, the sheet of the rewritten sheet ID 4 is being discharged while being passed through from the bypass conveyance path 23 to the purge conveyance path 24, and the sheet of the rewritten sheet ID 5 is being discharged while being passed through the main conveyance path 14.

In the above each jam occurrence state, the purge control can be performed by sheet conveyance control similarly to that of the usable sheets even if the sheets are not discharged in the original discharge order.

That is, when a jam of a sheet has occurred, the order information of the unusable sheets remained inside the machine is set, and the unusable sheets can be efficiently discharged based on the order information. Further, labor of manually removing the unusable sheets remained inside the machine at the time of occurrence of a jam can be reduced, and the purge processing of unusable sheets can be realized without implementation of special sheet conveyance control. For example, the purge processing of unusable sheets can be performed using a conventional sheet discharge unit without providing of a special mechanism between the image forming unit and the sheet discharge unit, such as a purge stacker.

Note that this embodiment has been described such that the purge processing of the unusable sheets is started before the jammed sheet is manually removed. However, the purge processing may be started after the jammed sheet is removed. The start timing of the purge processing may be set by mechanical setting, in advance, and the setting may be able to be changed irrespective of the time of jam occurrence. Alternatively, the start of the purge processing may be able to be operated by an operator.

Note that, in the above jam occurrence form, description has been made such that the order of sheets is set at the time of occurrence of a jam, and the order is different from the order before setting. However, the setting may be completed without changing the order at the order setting. That is, when it is determined that the change is not necessary at the order setting, setting of the change is not necessary.

Figure 9:
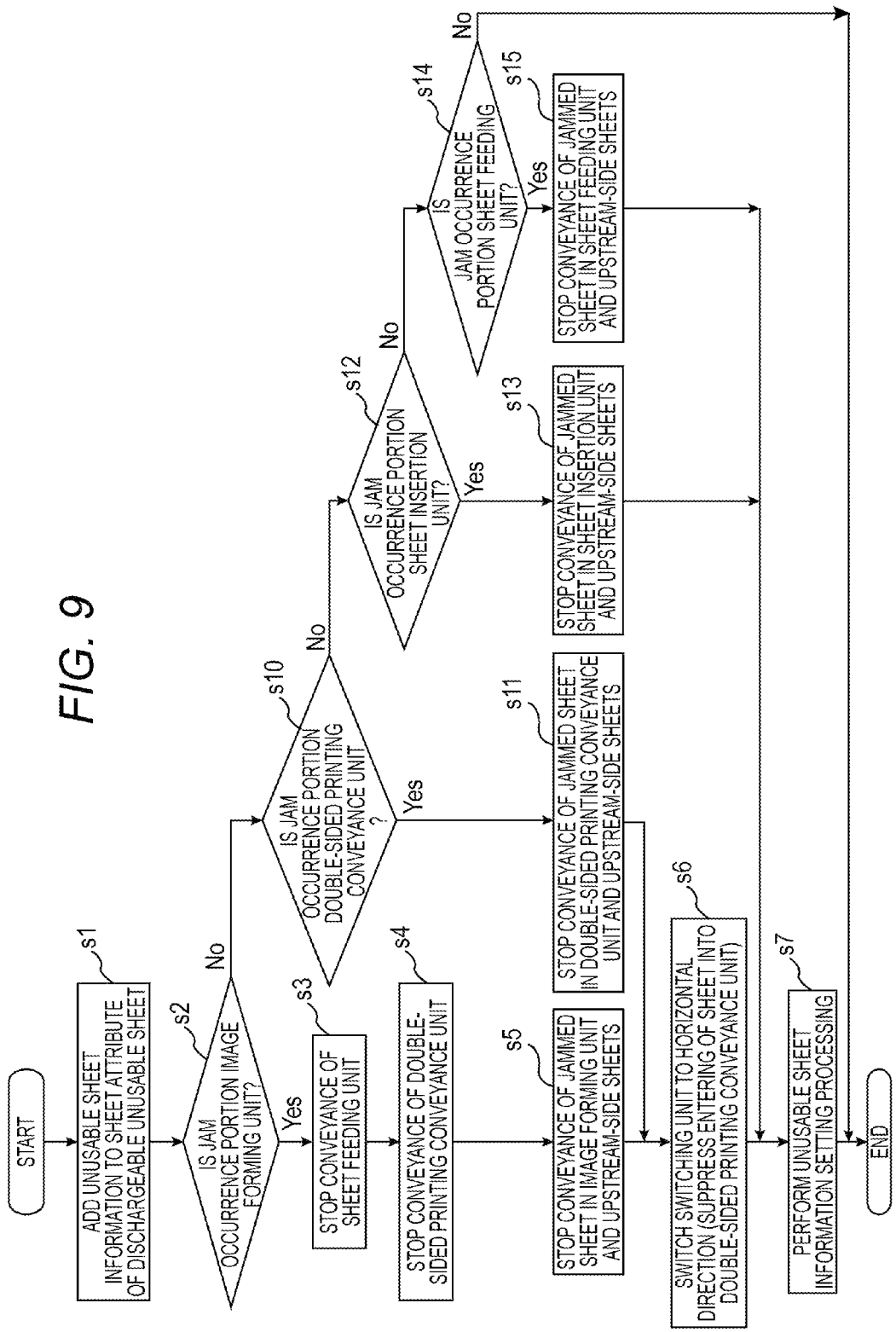
FIG. 9 is a diagram illustrating a flow of unusable sheet purge processing.

Next, a procedure of the unusable sheet purge processing of when a jam has occurred will be described with reference to FIG. 9. Note that the processing procedure below is executed by the control unit of the present invention.

When a jam of a sheet has occurred in the sheet conveyance unit, the processing is started, and the unusable sheet information is added to the sheet attribute of dischargeable unusable sheets remained inside the machine (step S1). Next, whether a jam occurrence portion is in a periphery of the image forming unit (whether on the main conveyance path 14) is determined (step S2). If the jam occurrence portion is in a periphery of the image forming unit (Yes in step S2), conveyance of the sheet feeding unit is stopped (step S3). When the jam occurrence portion is not in a periphery of the image forming unit (No in step S2), whether the jam occurrence portion is the double-sided printing conveyance unit is determined (step S10).

In step S3, after the conveyance of the sheet feeding unit is stopped, conveyance of the double-sided printing conveyance unit is stopped (step S4), and conveyance of the jammed sheet in the periphery of the image forming unit and its upstream-side sheets is stopped (step S5). Following that, the switching unit is switched into the horizontal direction, entering of sheets into the double-sided printing conveyance unit is suppressed (step S6), and unusable sheet information setting processing is performed (step S7), and then the jam purge processing is terminated.

In step S10, whether the jam occurrence portion is the double-sided printing conveyance unit is determined (step S10), and when the jam occurrence portion is the double-sided printing occurrence unit (Yes in step S10), conveyance of the jammed sheet in the double-sided printing conveyance unit and its upstream-side conveyance are stopped (step S11). Then, the switching processing of the switching unit (step S6) and the unusable sheet information setting processing (step S7) are performed. Note that, when the jam occurrence portion is the double-sided printing occurrence unit, like step S3, conveyance of the sheet feeding unit may be further stopped. Accordingly, collision of a sheet conveyed from the sheet feeding unit with sheets including the jammed sheet remained inside the machine can be avoided.

In step S10, when the jam occurrence portion is not the double-sided printing conveyance unit (No in step S10), whether the jam occurrence portion is the sheet insertion unit is determined (step S12). When the jam occurrence portion is the sheet insertion unit (Yes in step S12), conveyance of the jammed sheet in the sheet insertion unit and its upstream-side conveyance are stopped (step S13). The processing of step S7 is continued. Note that, when the jam occurrence portion is the sheet insertion unit, like step S3, conveyance of the sheet feeding unit may be further stopped. Accordingly, collision of a sheet conveyed from the sheet feeding unit with the sheets including the jammed sheet remained inside the machine can be avoided.

In step S12 above, when the jam occurrence portion is not the sheet insertion unit (No in step S12), whether the jam occurrence portion is the sheet feeding unit is determined (step S14). When the jam occurrence portion is the sheet feeding unit (step S14), conveyance of the jammed sheet in the sheet feeding unit and its upstream-side sheets is stopped (step S15), and the processing of step S7 is continued. When the jam occurrence portion is not the sheet feeding unit in step S14 (No in step S14), the processing is terminated.

Note that, in the above description, the jam occurrence portion is appropriately determined, and the processing is performed. However, determination of the jam occurrence portion is not especially limited, and determination may be made in a necessary portion.

Figure 10:
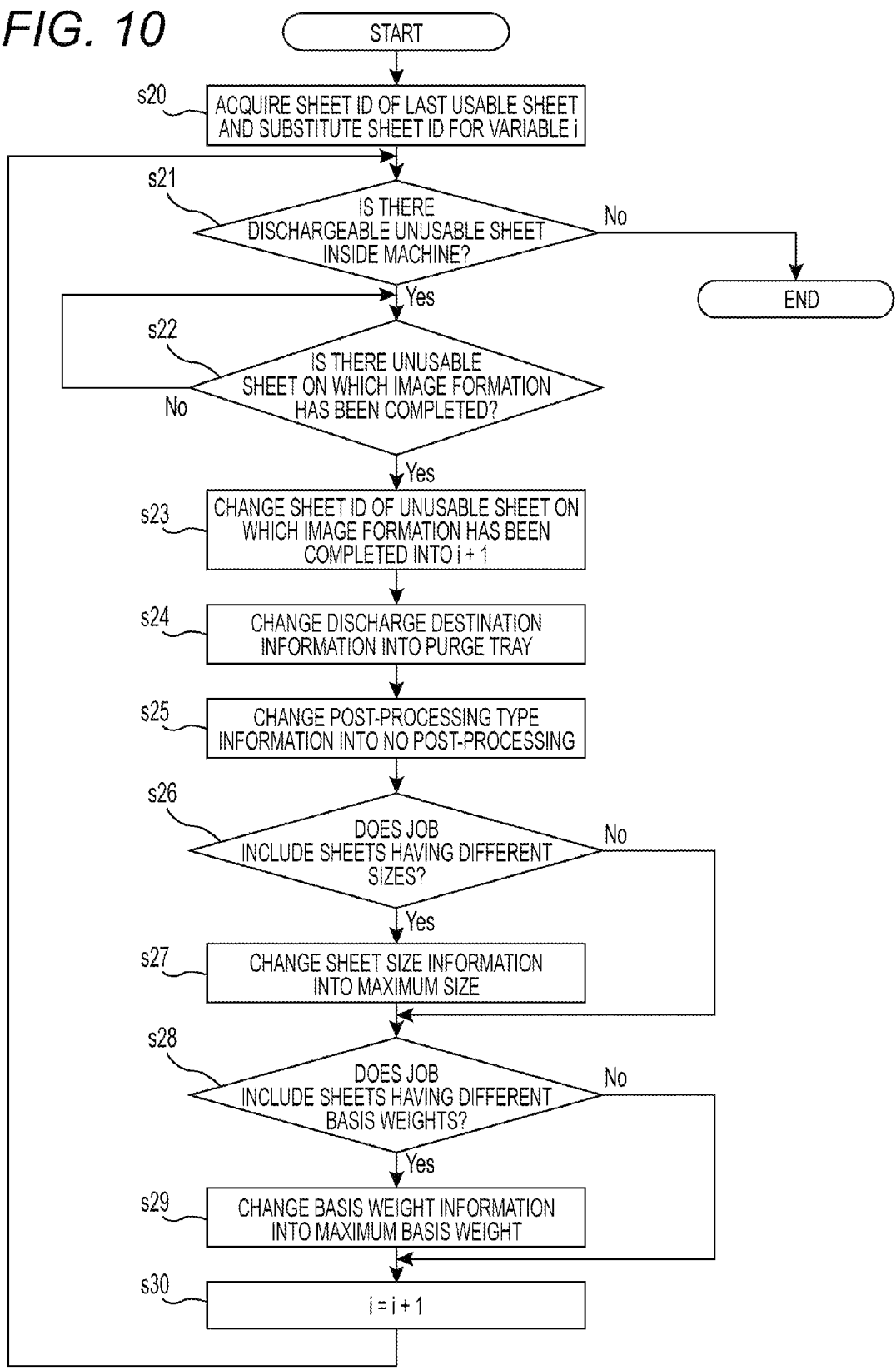
FIG. 10 is a diagram illustrating a flow of unusable sheet information setting processing.

Next, a procedure of the unusable sheet information setting processing will be described with reference to the flowchart of FIG. 10. Note that the processing procedure below is executed by the control unit of the present invention.

The sheet ID of the last usable sheet is acquired in association with the start of the processing, and the sheet ID is substituted for a variable i (step S20). Next, whether there is a dischargeable unusable sheet inside the machine is determined (step S21), and when there is no dischargeable unusable sheet (No in step S21), the processing is terminated. When there is a dischargeable unusable sheet inside the machine (Yes in step S21), whether an unusable sheet on which the image formation has been completed in the image forming unit is determined (step S22). To be specific, in the present embodiment, whether there is an unusable sheet on which the image formation has been completed in the image forming unit is determined by determining of whether there is an unusable sheet that has arrived at the image forming unit exit. Then, the processing waits until there is an unusable sheet on which the image formation has been completed in the image forming unit (step S22). When there is an unusable sheet on which the image formation has been completed in the image forming unit (Yes in step S22), the sheet ID of the unusable sheet on which the image formation has been completed in the image forming unit is changed into i+1 (step S23). Next, the discharge destination information of the sheet is changed into a purge tray (step S24), and the post-processing type information is changed into no post-processing (step S25). Next, whether the job includes sheets having different sizes is determined (step S26). When sheets having different sizes are mixed (Yes in step S26), the sheet size information is changed into the maximum size (step S27), and whether the job includes sheets having different basis weights is determined (step S28).

When the job does not include sheets having different sizes in step S26 (No in step S26), the processing moves on to step S28 without changing the sheet size information.

When sheets having different basis weights are mixed in step S28 (Yes in step S28), the basis weight information in the sheet attribute is changed into the maximum basis weight (step S29). When the job does not include sheets having different basis weights in step S28, the processing moves on to step S30 without changing the basis weight.

After step S29, 1 is added to i (step S30), the processing is returned to step S21, and subsequent processing is continued until there is no dischargeable unusable sheet.

As described above, in the present embodiment, the image forming unit sets the discharge order of the unusable sheets based on whether there is an unusable sheet on which the image formation has been completed (to be specific, whether there is an unusable sheet that has arrived at the image forming unit exit), and discharges the unusable sheets outside the machine based on the set order information. Accordingly, the sheet on which the image formation has been completed (the sheet in a state capable of being discharged) can be promptly discharged outside the machine.

While the description of the present invention has been made based on the embodiments, the present invention is not limited to the content of the embodiments, and appropriate changes can be made as long as the changes do not depart from the scope of the present invention.

Although the present invention has been described and illustrated in detail, it is clearly understood that the same is by way of illustration and example only and is not to be taken by way of limitation, the scope of the present invention being interpreted by terms of the appended claims.

What is claimed is:

1. An image forming apparatus comprising:
   an image forming unit configured to form an image on a sheet based on a job;
   a sheet conveyance unit configured to convey a sheet through a conveyance path; and
   a control unit configured to control conveyance of a sheet, wherein when a jam has occurred in a sheet during conveyance,
   the control unit sets order information of dischargeable sheets among unusable sheets remaining inside the apparatus after occurrence of the jam based on whether there is an unusable sheet on which image formation has been completed in the image forming unit,
   and discharges the unusable sheet to an outside of the apparatus through the conveyance path based on the set order information, and
   wherein the control unit changes an order and performs the discharge of the dischargeable sheets as a result of an order information determination in the setting of the order information.

2. The image forming apparatus according to claim 1, wherein the control unit determines whether there is an unusable sheet on which image formation has been completed in the image forming unit based on whether there is an unusable sheet that has arrived at an exit of the image forming unit.

3. The image forming apparatus according to claim 1, wherein the conveyance path includes branching and merging.

4. The image forming apparatus according to claim 1, wherein, when a jam of a sheet has occurred in one conveyance path that has branched, the control unit performs the discharge of the unusable sheet existing on the conveyance path before branching through a conveyance path branching into another.

5. The image forming apparatus according to claim 1, wherein the order information is included in data of the job as one piece of attribute information of each sheet.

6. The image forming apparatus according to claim 1, wherein the control unit adds information indicating that a sheet is unusable to attribute information corresponding to the unusable sheet.

7. The image forming apparatus according to claim 1, wherein the control unit discharges the unusable sheet to a sheet discharge destination different from a sheet discharge destination of a normal sheet.

8. The image forming apparatus according to claim 1, wherein, when the jam has occurred, the control unit performs the discharge of sheets giving priority to an order of a conveyance path to be used by a normal sheet among sheet-conveyable conveyance paths.

9. The image forming apparatus according to claim 1, wherein the control unit sets the order information according to an arrangement order of sheets arranged along an order of sheet-conveyable conveyance paths.

10. The image forming apparatus according to claim 1, wherein, when discharging an unusable sheet, the control unit sets the sheet not to be subjected to post-processing.

11. The image forming apparatus according to claim 1, wherein, when discharging an unusable sheet, the control unit sets size information in attribute information of the sheet to a maximum size with which conveyance setting is possible.

12. The image forming apparatus according to claim 1, wherein, when discharging an unusable sheet, the control unit sets basis weight information in attribute information of the sheet to a maximum basis weight with which conveyance setting is possible.

13. The image forming apparatus according to claim 1, wherein, when the jam has occurred, the control unit stops conveyance of the sheet, and discharges the unusable sheet after removal of the jammed sheet.

14. An image forming system comprising:
    the image forming apparatus according to claim 1; and
    an external apparatus.

15. The image forming system according to claim 14, wherein the external apparatus includes a part of the sheet conveyance unit.

16. A method of forming an image conveyed through a conveyance path based on a job,
    the method comprising:
    when a jam has occurred in a sheet during conveyance, setting order information of dischargeable sheets among unusable sheets remaining inside an apparatus after occurrence of the jam based on whether there is an unusable sheet on which image formation has been completed in an image forming unit,
    and discharging the unusable sheet to an outside of the apparatus through the conveyance path based on the set order information,
    wherein an order is changed and the discharge of the dischargeable sheets is performed as a result of an order information determination in the setting of the order information.

17. The method of forming an image according to claim 16, wherein whether there is an unusable sheet on which image formation has been completed in the image forming unit is determined based on whether there is an unusable sheet that has arrived at an exit of the image forming unit.

18. The method of forming an image according to claim 16, wherein, when a jam of a sheet has occurred in one conveyance path that has branched, the discharge of the unusable sheet existing on the conveyance path before branching is performed through a conveyance path branching into another.

19. The method of forming an image according to claim 16, wherein the order information is included in data of the job as one piece of attribute information of each sheet.

20. The method of forming an image according to claim 16, wherein information indicating that a sheet is unusable is added to attribute information corresponding to the unusable sheet.

21. The method of forming an image according to claim 16, wherein the unusable sheet is discharged to a sheet discharge destination different from a sheet discharge destination of a normal sheet.

22. The method of forming an image according to claim 16, wherein, when the jam has occurred, priority is given to an order of a conveyance path to be used by a normal sheet among sheet-conveyable conveyance paths and the discharge of sheets is performed.

23. The method of forming an image according to claim 16, wherein the order information is set according to an arrangement order of sheets arranged along an order of sheet-conveyable conveyance paths.

24. The method of forming an image according to claim 16, wherein, when an unusable sheet is discharged, the sheet is set not to be subjected to post-processing.

25. The method of forming an image according to claim 16, wherein, when an unusable sheet is discharged, size information in attribute information of the sheet is set to a maximum size with which conveyance setting is possible.

26. The method of forming an image according to claim 16, wherein, when an unusable sheet is discharged, basis weight information in attribute information of the sheet is set to a maximum basis weight with which conveyance setting is possible.

27. The method of forming an image according to claim 16, wherein, when the jam has occurred, conveyance of the sheet is stopped, and the unusable sheet is discharged after removal of the jammed sheet.

* * * * *